3,375,068
PHOSPHORIC ACID EXTRACTION
Gerhard J. Frohlich, Ridgewood, N.J., and Thomas W. Segar and Ting Sin Go, Minneapolis, Minn., assignors to St. Paul Ammonia Products, Inc., St. Paul, Minn., a corporation of Minnesota
No Drawing. Filed Mar. 1, 1965, Ser. No. 436,338
8 Claims. (Cl. 23—165)

ABSTRACT OF THE DISCLOSURE

A liquid-liquid extraction procedure is provided using an organic amide in an inert solvent both to extract trivalent iron from phosphoric acid solutions and, by varying the amide concentration, to extract phosphoric acid itself.

This invention relates to the recovery of phosphoric acid from crude aqueous solutions thereof resulting from the hydrochloric acid acidulation of solid inorganic phosphate material, e.g., phosphate rock, which is composed predominantly of tricalcium phosphate. In particular this invention relates to a new and useful liquid-liquid extraction procedure enabling the economic production of super phosphoric acid, i.e., phosphoric acid containing by weight at least 70% $P_2O_5$, of high purity, from crude solutions of hydrochloric acid dissolved phosphate rock, which crude solutions may be contaminated with both calcium and iron impurities.

In the recovery of phosphoric acid from crude aqueous phosphoric acid containing calcium chloride brine solutions resulting, for example, from hydrochloric acid dissolved tricalcium phosphate rock, liquid-liquid extraction procedures have heretofore been suggested to take advantage of the greater solubility of phosphoric acid in organic extractants than in aqueous solutions having high calcium, or other cation, ion concentration. Sulfuric acid and nitric acid dissolved phosphate rock solutions do not admit of the same liquid-liquid extraction procedures as do calcium chloride brines as the calcium by-products of these acidulations are more insoluble and provide fewer calcium ions in solution, which ions provide the driving force causing phosphoric acid to migrate from aqueous phase to organic extractant.

The crude phosphoric acid containing calcium chloride brine, resulting from hydrochloric acid acidulation of phosphate rock, provides an environment from which the phosphoric acid is readily extracted with organic extractants, i.e., phosphoric acid removers. By intimately contacting the extractant and crude solution, the phosphoric acid migrates from the aqueous chlorinated solution to the organic extractant. Then, the phosphoric acid can be removed from the extractant by various procedures suggested in the art, depending on the solvent extractant used. The first extraction, from crude solution to organic extractant, is the "forward extraction"; when the acid is then washed from the extractant with an aqueous medium, as contrasted with the use of steam or the like, this procedure is referred to herein as "back extraction." The aqueous medium can be any water medium free from significant cation concentration. Fresh water (as contrasted with salt water, for example) is the preferred back extraction medium.

Patent No. 2,800,063, issued Mar. 31, 1959 to Baniel and Blumberg, assigned to Israel Mining Industries, suggests extraction of phosphoric acid from calcium chloride brines with a lower aliphatic alcohol or ketone, particularly isoamyl alcohol, as the extractant: Patent No. 3,072,461, issued Jan. 8, 1963 to Long and Ellis, and assigned to Dow Chemical Company, suggests extraction with trialkyl phosphates, particularly tributyl phosphate.

Extraction of phosphoric acid from calcium chloride brines with these prior suggested organic extractants also results in the co-extraction of significant impurities, particularly iron and calcium, from the crude solution, which are sufficiently soluble in the extractant that significant quantities migrate with the phosphoric acid into the extractant. This, of course, results in phosphoric acid still containing significant amounts of difficultly removable calcium and iron impurities. As a consequence, recovery of phosphoric acid having greater than 54% $P_2O_5$ with these prior known solvents is extremely difficult, if not impossible, as the iron impurities, particularly, interfere with further concentration of the acid.

Also, solvents such as tributyl phosphate, being about the same density as water, make product separation difficult, and have in addition, other undesirable properties. Good alcohol extractants, such as isoamyl alcohol, are also relatively reactive with both hydrochloric acid and phosphoric acid. These alcohols further have a wide range of mutual solubility with fresh water resulting in considerable solvent loss; and, they tend to form stable emulsions if back extraction with water is attempted. Separation of phosphoric acid from these solvents must be by distillation or hot gas, making separation quite expensive. Also, because of low solubility for phosphoric acid, these prior used solvents must be used in large quantities necessitating large capacity processing equipment.

The presence of iron is of little consequence in the production of ordinary phosphoric acid (54% $P_2O_5$); it is extremely detrimental to the production of super phosphoric acid as the iron impurities form iron polyphosphates which prevent further concentration of the acid product, the product becoming unduly viscous, difficultly separable, and discolored. Also, the iron impurities reduce the water solubility of phosphatic fertilizers for which a large percentage of phosphoric acid is used.

While ferric iron is usually co-extracted with the same liquid extractants as is the phosphoric acid, in the prior suggested phosphoric extraction procedures noted hereinbefore the presence of the iron is simply ignored, making the production of super phosphoric acid following these procedures difficult, if not impossible. While removal of ferric iron is possible with extractants which are not also extractants for phosphoric acid, residual amounts of these iron pre-extractants are carried forward in the crude aqueous solution from which the acid is to be removed and accumulates in the phosphoric acid solvent as it is recycled, thereby interfering with and complicating the forward extraction of phosphoric acid.

It is a general object of this invention to provide improved liquid-liquid extraction procedures to extract phosphoric acid from crude aqueous solutions of hydrochloric acid dissolved tricalcium phosphate rock, which procedures are free from many of the problems inherent in heretofore suggested liquid-liquid phosphoric acid extraction procedures.

It is among the specific objects of this invention to provide organic solvents extracting phosphoric acid from calcium chloride brines which solvents have phosphoric acid, calcium and iron solvency powers readily controlled by dilution with an inexpensive, inert aromatic diluent.

It is a specific object of this invention to provide an extraction procedure which enables the use of a common solvent, albeit in different concentrations, in an aromatic diluent, for both the pre-extraction of iron and the subsequent extraction of phosphoric acid.

It is a further object of this invention to provide a phosphoric acid extractant which is free from the emulsion tendencies and water solubility of isoamyl alcohol, which has a stability and freedom from solvent loss during extraction procedures comparable to tributyl phosphate, and which more readily releases phosphoric acid therefrom on back extraction than either of these previously suggested extractants.

It is a particular object of this invention to provide an organic extractant for removing phosphoric acid from calcium chloride brines which combines high phosphoric acid solvency with significant density difference from water, high boiling temperatures i.e., above 85° C., and ready release of phosphoric acid therefrom upon back extraction.

Other objects and advantages will be apparent as the description proceeds.

Where percentages and parts are used hereinafter they are in weight units unless otherwise specified.

In accordance with one aspect of this invention, iron is pre-extracted and phosphoric acid is extracted from the crude, aqueous phosphoric acid solution resulting from aqueous hydrochloric acidulation of phosphate rock by extraction with liquid extractants comprising certain water-immiscible N,N-disubstituted organic amides having high phosphoric acid solvency in organic diluents.

We have found, particularly, that the N,N-disubstituted alkyl and aryl carboxyl amides, when diluted with an aromatic diluent, not only provide superior phosphoric acid extractants but can further, by selective control of the concentration thereof in a water insoluble inert aromatic diluent, be used as an iron impurity pre-extractant (without extracting phosphoric acid), and as a phosphoric acid extractant for the removal of phosphoric acid from crude aqueous phosphoric acid solutions resulting from the hydrochloric acid acidulation of phosphate rock.

The N,N-disubstituted amides useful in the practice of this invention are those amides soluble in organic diluents and which have high phosphoric acid solubility. While normally solid amides can be used, preferred amides are those which are liquid under ambient conditions, i.e., atmospheric pressure and temperatures ranging from about 15° C. to about 40° C.

Among the useful N,N-disubstituted organic amides are the di-lower alkyl, e.g., about 1 to 4 carbon alkyl, substituted amides of saturated monocarboxylic acids. Aliphatic acids having from about 6 to about 18 carbon atoms, and particularly those having acid chains of from about 8 to 12 carbon atoms, e.g., N,N-dimethyl capramide, N,N-dimethyl caprylamide, N,N-dimethyl myristamide, N,N-dimethyl lauramide, are preferred open chain amides. The lower alkyl substituents on the nitrogen atom of the amide may be the same or different. Among the useful, N-N-disubstituted aryl amides are the monocarboxylic aromatic acid amides such as benzamide and toluamide. A mixture of amides, e.g., N,N-dimethyl capramide and N,N-dimethyl caprylamide, may be used, and such mixtures are contemplated as being included within the singular nomenclature, unless otherwise expressed. While the preferred extractants noted above are all liquid at ambient, e.g., 10° C. to 40° C., temperatures, at which the process is normally practiced, the process can be carried out at higher or lower temperatures.

The sequence is that the metallic impurities are first extracted from the crude aqueous phosphoric acid solution with a liquid organic extractant in a pre-extraction procedure; phosphoric acid is then extracted from the iron depleted crude solution by forward extraction with the same liquid organic extractant. Thereafter the phosphoric acid is back extracted from the organic extractant with an aqueous medium free from significant calcium cations, in which it is more soluble than in the organic extractant, so that the phosphoric acid is again in an aqueous vehicle, but in purified form, whereupon it can be concentrated to the desired strength by distillation.

Extraction of phosphoric acid from hydrochloric acid dissolved crude solutions of tricalcium phosphate rock with these new solvents has been found to result in a pure, readily back extracted acid product not possible with prior used solvents, e.g., isoamyl alcohol and tributyl phosphate, characteristics of consummate significance in the production of super phosphoric acid, with or without the added benefit of iron pre-extraction with the same solvent.

Further, the significant density differences from water of these solvents in their diluted forms as compared to tributyl phosphate, coupled with their high boiling temperature and stability against decomposition in solution make their use in the extraction of HCl dissolved $H_3PO_4$ from its crude acidulation solution even more attractive commercially. The low density of these diluted solvents coupled with their high phosphoric acid solubility permits the use of less extractant to extract the same amount of $H_3PO_4$ extracted with alcohols or phosphates.

In the practice of the invention an inorganic phosphate rock is acidulated, at about 40–80° C., with about a4 to 9 molar (M) hydrochloric acid, the acid being in slight excess, e.g., 5%, to assure complete digestion of the tricalcium phosphate of the rock. The resultant crude aqueous solution is primarily a phosphoric acid containing calcium chloride brine, having in addition, dissolved impurities therein such as iron (ferric), fluorine, aluminum, and other of lesser significance.

The N,N-disubstituted amide is not ordinarily used in undiluted form as its calcium solubility is quite high. However, we have found that this solubility is greatly lessened when the solvent is diluted with an aromatic diluent which is also water-immiscible and in which the amide is soluble. Benzene is a preferred diluent because of its universal availability and inexpense although other aromatic diluents such as toluene, xylene, ethyl benzene, diethyl benzene, and others which are free from undesirably reactive groups can be used. When the amide extractant concentration in the diluent is less than about 20%, and preferably from about ½ of 1% to about 10%, the extractant is fairly specific to the extraction of ferric iron to the substantial exclusion of phosphoric acid from a phosphoric acid containing calcium chloride brine.

At concentrations at and above about 20% to about 80%, these amides have been found to form excellent extractants for extracting phosphoric acid from calcium chloride brine. Preferred concentrations are from about 40:60 to about 60:40 amide to diluent.

In general, in the pre-extraction and forward extraction a ratio of about 1:1 to about 5:1 extractant to crude solution is used. In back extraction, an extractant to back extracting aqueous medium ratio of about 20:1 to 5:1 can be used, with about 10:1 to 15:1 being preferred.

EXAMPLE 1

This example illustrates the considerably greater amount of extractant required to produce a comparable product acid with tributyl phosphate as the extractant than is required with an extractant of the present invention, such as N,N-dimethylcaprylamide-capramide (DCCA).

Crude aqueous phosphoric acid solution of the following composition was produced by the acidulation of a low grade tricalcium phosphate rock with a slight excess, less than about 5%, of a 6 M hydrochloric acid:

| | Wt. percent |
|---|---|
| $H_3PO_4$ | 10.2 |
| HCl | 2.3 |
| $CaCl_2$ | 21.6 |
| Fe | 0.4 |
| F | 0.5 |

Utilizing this crude phosphoric acid solution as the feed stock, two separate and parallel extraction experiments were conducted in a 36 stage York-Scheibel agitated extraction column with a 6-stage top reflux section. In one case, a mixture of 45% amide and 55% benzene, the amide being a 55:45 DCCA, was used as the extractant, and in the other case, a mixture of 80% tributyl phosphate (TBP) and 20% benzene was used as the extractant, to extract the phosphoric acid from the crude solution. DCCA and TBP constituted the active solvents with benzene being the diluent in both cases.

In the DCCA procedure 40 parts extractant were used in the forward extraction for each 16 parts crude acid solution. In the TBP procedure 61 parts extractant were used for each 14 parts crude acid solution in the forward extraction. Only in this way was the same approximate amount of acid extracted into each extractant.

The phosphoric acid laden extractant from each of these operations was then contacted by countercurrent flow in a 36 stage York-Scheibel column with fresh water to back extract the phosphoric acid from the extractant to yield an aqueous solution of the final product acid for comparison. In the case of the DCCA based extractant, 9.2 parts by weight of water were required, and in the case of the TBP extractant, 13.2 parts by weight of water were required, to back extract the same amount of product acid from the extractant.

The phosphoric acid yield was about the same and the acid recovered had the following composition:

|  | DCCA | TBP |
| --- | --- | --- |
| $H_3PO_4$ | 21.3 | 18.5 |
| $CaCl_2$ | 0.094 | 0.122 |
| Fe | 0.036 | 0.051 |
| Al | 0.047 | 0.024 |
| F | 0.096 | 0.227 |
|  | 0.273 | 0.424 |

As will be observed, the DCCA extractant utilized about 40% less solvent and required about 40% less water on back extraction to produce an acid with about 35% less impurities than did the TBP-extractant.

EXAMPLE 2

Following the procedure of Example 1, 338 parts of the crude phosphoric acid solution of Example 1 from which iron was pre-extracted in accordance with procedure of Example 3 following, were fed to a nine stage mixer-settler apparatus in which the acid was contacted by countercurrent flow with 880 parts of an extractant of 70% N,N-diethyl toluamide and 30% benzene. Fourteen and one-half parts of 37% HCl were injected into the second and sixth stages of the nine stage apparatus to increase the acidity of the brine and thereby improve the extraction.

From the phosphoric acid laden solvent thus obtained, the phosphoric acid was back extracted with 96 parts of fresh water by countercurrent flow in a seven stage mixer-settler apparatus to produce an aqueous solution of phosphoric acid in 99% yield having the following composition:

| | |
| --- | --- |
| $H_3PO_4$ | 17.46 |
| HCl | 5.91 |
| $CaCl_2$ | 0.11 |
| Fe | 0.003 |

EXAMPLE 3

As is demonstrated by this example the solvent extractants of this invention serve as excellent pre-extractants for the removal of iron from the crude phosphoric acid containing calcium chloride brine resulting from hydrochloric acid acidulation of phosphate rock.

Crushed, unground (passed through 8 mesh screen, U.S. Standard scale) low grade phosphate rock (28.5% $P_2O_5$, 1.12% Fe, 3.64% F.) was acidulated with 20% hydrochloric acid at ambient temperature of about 40–60° C. as follows:

| Acidulation: | Parts by Wt. |
| --- | --- |
| Phosphate rock | 7,568 |
| 20% HCl | 22,936 |
| Crude aqueous solution from acidulation | 28,314 |

The resulting crude aqueous acidulation solution had a crude acid composition as follows:

| Crude acid composition: | Wt. percent |
| --- | --- |
| $H_3PO_4$ | 10.36 |
| Fe | 0.25 |
| F | 0.95 |
| $CaCl_2$ | 21.42 |
| HCl | 0.77 |

For all practical purposes, the iron was entirely in the ferric state, agitation of the crude acid in the presence of air around the acidulation vessel having converted any ferrous iron to the ferric form.

The iron was extracted from the crude solution by countercurrent flow contact of the crude solution with an iron extractant of 3% DCCA in benzene as follows:

| | |
| --- | --- |
| Pre-extraction of iron | |
| Extractant to feed ratio (mass basis) | 3.00 |
| Parts of HCl coextracted with iron from crude acid solution | 212.5 |
| Percent of iron removed from solution | 95.2 |
| Parts of $H_3PO_4$ coextracted with iron from the crude solution | 10.1 |

The hydrochloric acid was recovered from the solvent for reuse by water washing and evaporation. By this procedure the iron content of the crude acid composition in the solution was reduced to 0.012%.

EXAMPLE 4

Using the same starting phosphoric acid crude solution of Example 3, from which the iron had been pre-extracted to an iron content of 0.012%, a phosphoric acid extraction and recovery process was carried out by dividing the crude, but iron depleted, solution into three parts. Phosphoric acid was then extracted from each of these three crude solution batches by forward extraction with a different extractant. This was accomplished by contacting each batch in a 9 stage countercurrent mixer-settler apparatus with two stages of reflux to scrub and enrich the phosphoric acid laden solvent produced. One extractant was a mixture of 45% DCCA and 55% benzene, another was a mixture of 80% TBP and 20% benzene, and the third extractant was isoamyl alcohol (IAA). The DCCA was a 55:45 capryl to capric amide. The procedure followed for extraction with each of the three crude acid mixtures was identical and was as follows:

FORWARD EXTRACTION WITH REFLUX

| | DCCA | TBP | IAA |
| --- | --- | --- | --- |
| Solvent Composition: | | | |
| Wt. percent active | 45 | 80 | 100 |
| Wt. percent diluent | 55 | 20 | |
| Solvent to feed ratio (mass basis) | 3.53 | 4.65 | 3.95 |
| Total reflux, parts by weight (to scrub out calcium) | 2,436 | 2,441 | 3,647 |
| Wt. percent $H_3PO_4$ in reflux | 30 | 30 | 20 |
| Parts of $H_3PO_4$ in reflux per part of $H_3PO_4$ in feed acid | 0.25 | 0.25 | 0.25 |

Because phosphoric acid is more soluble in it than in the other extractants, the DCCA based extractant required the least amount of solvent, as is demonstrated by the lower solvent to feed ratio. Both the DCCA and the isoamyl alcohol displayed considerable density differential of the extractant to the aqueous crude acid phase permitting high throughputs of these mixtures as compared to the tributyl phosphate.

The phosphoric acid laden solvent resulting from each of these three forward extractions was then back extracted by countercurrent flow contact with fresh water in a 7-stage mixer-settler apparatus to strip the phosphoric acid from the solvent. The DCCA system was stripped of its phosphoric acid very readily and enabled an extremely high throughput as compared with either of the other two, being roughly three to five times as fast as the TBP system, and even faster when compared with the IAA system which would not be back extracted at ambient temperature; i.e., 30° C. in this example.

The tributyl phosphate system separated very slowly and tended to mechanically emulsify because of the similarity in density to the back extracting water, requiring centrifugation to separate the phases.

The isoamyl alcohol, when contacted with the back extracting water formed a stable emulsion that would not separate out. On centrifugation, the emulsion formed a semi-solid layer between the solvent and aqueous phases. However, by steam stripping of the alcohol, a strong phosphoric acid was produced with the isoamyl alcohol. Because very high steam consumption is required, this procedure is commercially not feasible when contrasted with the DCCA back extraction procedure. The results of the back extractions are shown in the table following:

BACK EXTRACTION

|  | DCCA | TBP | IAA |
|---|---|---|---|
| Total parts by weight of $H_3PO_4$ containing back extractant water | 103,473 | 133,249 | |
| Parts by weight of water | 11,068 | 19,686 | |
| Parts by weight product acid | 17,418 | 25,615 | 10,800 |
| Weight percent $H_3PO_4$ | 20.84 | 14.20 | 33.65 |
| Parts of fluorine in acid before evaporation | 13 | 29 | 42 |

While the IAA acid percentage is higher, it is again noted that it was obtainable at all, only by steam stripping, which accounts for the difference; on a water back extraction basis the percent phosphoric acid recovered would have been about 15% if recovery could have been accomplished by such procedure.

Upon concentration of the back extraction product to 54% $P_2O_5$, the comparison was as follows:

PRODUCT ACID SOLVENT RECOVERY AND CONCENTRATION

|  | DCCA | TBP | IAA |
|---|---|---|---|
| Parts of final product acid | 3,853 | 3,858 | 3,853 |
| Wt. percent $H_3PO_4$ | 75.2 | 75.2 | 75.2 |
| Wt. percent $P_2O_5$ | 54.5 | 54.5 | 54.5 |
| Wt. percent Cl | 0.7 | 0.7 | 0.7 |
| Wt. percent Ca | 0.21 | 0.83 | 0.82 |
| Wt. percent Fe | 0.07 | 0.07 | 0.07 |
| Wt. percent Al | 0.17 | 0.08 | 0.09 |
| Wt. percent F | 0.06 | 0.06 | 0.06 |

As will be noted approximately four times a much calcium is present in the TBP and IAA systems as is present in the DCCA system.

As is apparent from the foregoing examples, the N,N-disubstituted amides serve both as excellent pre-extractant solvents for iron and/or forward extractant solvents for phosphoric acid, providing an ease and efficiency of liquid-liquid extraction of phosphoric acid from crude aqueous calcium chloride brines not obtainable with previously known solvents for this purpose.

While the invention has been described particularly with reference to the HCl acidulation of tricalcium phosphate rock, the extractants and procedures of this invention are applicable to other crude phosphoric acid solutions having high cation concentrations—thus, other variants, will occur to those skilled in the art, and the invention is to be construed in accordance with a scope commensurate with that particularly pointed out in the claims following.

We claim:
1. A method for producing phosphoric acid from a crude aqueous solution of phosphoric acid in calcium chloride brine containing ferric impurities comprising first contacting said aqueous solution with a pre-extractant comprising an N,N-dialkyl substituted organic amide dissolved in an aromatic diluent to extract ferric impurities therefrom, the concentration of said amide in said diluent being from about ½ of 1% to about 10%, separating the iron rich pre-extractant from said crude aqueous solution, then contacting the ferric impurity depleted crude aqueous phosphoric acid solution with a liquid phosphoric acid extractant comprising an N,N-dialkyl substituted organic amide in an aromatic diluent, the said amide concentration in said diluent being from about 20% to about 80%, to extract phosphoric acid from said crude aqueous solution, then separating the phosphoric acid carrying extractant from the remaining crude aqueous solution and separating the phosphoric acid therefrom.

2. A method for producing phosphoric acid which comprises acidulating an iron containing inorganic tricalcium phosphate rock with a stoichiometric excess of 4 to 9 molar hydrochloric acid, then intimately contacting the resultant phosphoric acid containing calcium chloride brine with a liquid pre-extractant comprising an aromatic diluent containing from about 0.5% to about 10% by weight of an N,N-di-lower-alkyl substituted carboxy amide to remove the iron impurities therefrom, thereafter contacting said crude solution with a liquid phosphoric acid extractant comprising about 20% to about 80% of an N,N-di-lower-alkyl substituted carboxyamide and about 20% to 80% aromatic diluent to extract the phosphoric acid from said solution, then contacting the phosphoric acid carrying extractant with fresh water and back extracting the phosphoric acid therefrom, each of the lower alkyl substituents of the amide of said pre-extractant and that of said extractant having from about one to four carbon atoms.

3. The method of claim 2 wherein said amide is one or more N,N-dialkyl substituted amide of an aliphatic carboxylic acid having 6 to 18 carbon atoms.

4. The method of claim 2 wherein said amide is an N,N-dialkyl substituted aryl amide.

5. A method for removing trivalent iron impurities from an aqueous solution of phosphoric acid which comprises contacting said solution with an extractant of water-immiscible N,N-dialkyl substituted organic amide dissolved in an inert aromatic diluent, the concentration of said amide in said diluent being from about 0.5% to no more than 20%.

6. The method of claim 5 wherein said amide is one or more N,N-dialkyl substituted amide of an aliphatic mono-carboxylic acid having from 6 to 18 carbon atoms.

7. The method of claim 6 wherein the alkyl substituents of said N,N-dialkyl substituted amide contain from 1 to 4 carbon atoms.

8. The method of claim 5 wherein said amide is N,N-dimethyl caprylamide or N,N-dimethyl capramide or a mixture thereof.

References Cited

UNITED STATES PATENTS 3,304,157    2/1967    Baniel et al. _____ 23—165

OSCAR R. VERTIZ, *Primary Examiner.*

A. GRIEF, *Assistant Examiner.*